(12) United States Patent
Lord et al.

(10) Patent No.: US 12,523,561 B2
(45) Date of Patent: Jan. 13, 2026

(54) THERMAL CONDUCTIVITY VACUUM GAUGE AND THERMAL COMPENSATION ASSEMBLY

(71) Applicant: Edwards Limited, Burgess Hill (GB)

(72) Inventors: Gary Michael George Lord, Burgess Hill (GB); Matthew Gareth Key, Burgess Hill (GB); Nicholas Daniel Hutton, Burgess Hill (GB); Glen Croft, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 260 days.

(21) Appl. No.: 18/253,683

(22) PCT Filed: Nov. 17, 2021

(86) PCT No.: PCT/GB2021/052983
§ 371 (c)(1),
(2) Date: May 19, 2023

(87) PCT Pub. No.: WO2022/106822
PCT Pub. Date: May 27, 2022

(65) Prior Publication Data
US 2023/0417615 A1    Dec. 28, 2023

(30) Foreign Application Priority Data
Nov. 23, 2020 (GB) .................................... 2018362

(51) Int. Cl.
*G01L 21/12* (2006.01)
(52) U.S. Cl.
CPC .................... *G01L 21/12* (2013.01)

(58) Field of Classification Search
CPC . G01L 19/147; G01L 9/0072; G01L 19/0645; G01L 19/0084; G01L 9/0042;
(Continued)

(56) References Cited

U.S. PATENT DOCUMENTS

| 4,492,123 A | * | 1/1985 | Reich ...................... G01L 21/12 73/755 |
| 5,351,551 A | * | 10/1994 | Drubetsky .............. G01L 21/14 374/45 |

(Continued)

FOREIGN PATENT DOCUMENTS

| CN | 115326276 A | * | 11/2022 | ............... B81B 7/02 |
| CN | 119197874 A | * | 12/2024 | |

(Continued)

OTHER PUBLICATIONS

Combined Search and Examination Report dated Apr. 26, 2021 and Search Report dated Apr. 23, 2021 for corresponding British application Serial No. GB2018362.0, 6 pages.
(Continued)

*Primary Examiner* — Andre J Allen
(74) *Attorney, Agent, or Firm* — Theodore M. Magee; Westman, Champlin & Koehler, P.A.

(57) ABSTRACT

The present disclosure relates to a thermal conductivity vacuum gauge assembly. The assembly comprises a body defining an internal chamber for receiving working gas and a heater element disposed within the chamber. The body is defined by a wall having an outer facing wall surface and an opposing inner facing wall surface. A thermal compensation element is enclosed within the wall between the outer and inner facing wall surfaces. The present disclosure also relates to a thermal conductivity vacuum gauge including the assembly.

13 Claims, 3 Drawing Sheets

(58) Field of Classification Search
CPC ... G01L 19/007; G01L 9/0073; G01L 13/025; G01L 19/0038; G01L 9/0075; G01L 9/0054; G01L 9/0055; G01L 19/04; G01L 19/148; G01L 7/00; G01L 7/04; G01L 19/14; G01L 19/0092; G01L 19/143; G01L 15/00; G01L 17/00; G01L 7/18; G01L 9/0051; G01L 9/065; G01L 9/12; G01L 9/0052; G01L 7/041; G01L 9/125; G01L 19/0618; G01L 19/0609; G01L 19/003; G01L 19/0627; G01L 19/0046; G01L 7/16; G01L 19/0636; G01L 9/06; G01L 19/0023; G01L 7/084; G01L 9/007; G01L 9/0022; G01L 13/02; G01L 19/142; G01L 19/02; G01L 9/008; G01L 7/043; G01L 19/08; G01L 19/141; G01L 9/0002; G01L 19/0672; G01L 23/18; G01L 19/0681; G01L 9/006; G01L 11/02; G01L 19/0069; G01L 9/0077; G01L 7/082; G01L 19/12; G01L 27/005; G01L 9/0044; G01L 23/10; G01L 19/0015; G01L 21/12; G01L 7/063; G01L 19/146; G01L 27/002; G01L 27/007; G01L 9/0001; G01L 13/026; G01L 19/0654; G01L 9/0026; G01L 11/025; G01L 9/0047; G01L 9/045; G01L 11/00; G01L 9/0089; G01L 9/14; G01L 9/0025; G01L 11/008; G01L 13/00; G01L 19/00; G01L 9/16; G01L 7/08; G01L 19/0061; G01L 9/0041; G01L 7/22; G01L 9/0019; G01L 19/069; G01L 19/086; G01L 9/0076; G01L 9/08; G01L 21/00; G01L 9/0005; G01L 19/083; G01L 9/0035; G01L 1/18; G01L 9/10; G01L 9/0008; G01L 9/0016; G01L 9/04; G01L 11/006; G01L 19/06; G01L 1/2281; G01L 19/10; G01L 19/16; G01L 9/0048; G01L 9/0079; G01L 11/004; G01L 9/00; G01L 9/0027; G01L 9/0057; G01L 13/023; G01L 19/0663; G01L 7/048; G01L 9/0086; G01L 11/04; G01L 23/24; G01L 7/166; G01L 9/0091; G01L 1/02; G01L 19/145; G01L 1/20; G01L 11/002; G01L 27/00; G01L 7/182; G01L 9/0036; G01L 9/0039; G01L 9/0045; G01L 23/125; G01L 23/22; G01L 9/0061; G01L 9/0013; G01L 1/142; G01L 9/0092; G01L 1/2293; G01L 9/0033; G01L 9/0098; G01L 9/02; G01L 1/205; G01L 21/04; G01L 21/22; G01L 7/104; G01L 9/0007; G01L 9/0064; G01L 9/0083; G01L 7/24; G01L 9/0029; G01L 13/06; G01L 23/08; G01L 23/16; G01L 7/022; G01L 1/148; G01L 7/088; G01L 5/14; G01L 7/163; G01L 1/16; G01L 23/222; G01L 9/0085; G01L 9/025; G01L 21/14; G01L 1/2212; G01L 1/2287; G01L 9/0004; G01L 9/085; G01L 1/14; G01L 23/02; G01L 7/061; G01L 9/003; G01L 19/0076; G01L 9/002; G01L 9/0058; G01L 13/028; G01L 23/28; G01L 7/02; G01L 9/0095; G01L 1/162; G01L 1/2231; G01L 1/246; G01L 19/149; G01L 21/10; G01L 5/228; G01L 9/105; G01L 7/086; G01L 9/0038; G01L 7/024; G01L 7/12; G01L 9/0032; G01L 7/06; G01L 1/005; G01L 1/2206; G01L 1/2262; G01L 1/24; G01L 9/0082; G01L 1/146; G01L 1/26; G01L 11/06; G01L 13/021; G01L 19/144; G01L 7/187; G01L 23/26; G01L 27/02; G01L 1/125; G01L 1/144; G01L 23/00; G01L 9/0094; G01L 1/165; G01L 1/2268; G01L 21/34; G01L 23/221; G01L 7/068; G01L 7/102; G01L 7/20; G01L 9/0097; G01L 1/225; G01L 13/04; G01L 23/12; G01L 23/32; G01L 7/045; G01L 7/14; G01L 1/086; G01L 1/241; G01L 21/30; G01L 9/18; G01L 1/127; G01L 1/22; G01L 1/245; G01L 17/005; G01L 21/32; G01L 23/145; G01L 5/18; G01L 7/108; G01L 9/001; G01L 1/183; G01L 1/2218; G01L 5/0047; G01L 5/0076; G01L 9/0023; G01L 1/044; G01L 1/10; G01L 1/106; G01L 5/165; G01L 5/226; G01L 9/0017; G01L 9/005; G01L 9/0088; G01L 1/186; G01L 1/243; G01L 23/223; G01L 25/00; G01L 3/245; G01L 5/0038; G01L 5/0052; G01L 5/225; G01L 7/065; G01L 1/00; G01L 1/04; G01L 1/08; G01L 21/16; G01L 21/24; G01L 3/10; G01L 3/1485; G01L 5/0004; G01L 5/162; G01L 9/0014; G01L 1/103; G01L 1/2275; G01L 21/02; G01L 21/26; G01L 23/225; G01L 3/102; G01L 3/105; G01L 5/0028; G01L 5/0033; G01L 5/223; G01L 5/24; G01L 7/026; G01L 7/028; G01L 7/10; G01L 9/0011; G01L 1/083; G01L 1/12; G01L 1/242; G01L 1/247; G01L 1/255; G01L 2009/0069; G01L 21/08; G01L 21/36; G01L 23/04; G01L 23/14; G01L 3/103; G01L 5/00; G01L 5/102; G01L 5/133; G01L 5/1627; G01L 5/166; G01L 5/22; G01L 5/243; G01L 7/185; G01L 1/042; G01L 1/046; G01L 1/122; G01L 1/2225; G01L 1/2243; G01L 1/2256; G01L 1/248; G01L 2009/0066; G01L 2009/0067; G01L 2019/0053; G01L 21/06; G01L 23/06; G01L 23/085; G01L 23/30; G01L 3/00; G01L 3/06; G01L 3/1478; G01L 3/1492; G01L 3/18; G01L 3/24; G01L 3/242; G01L 5/0057; G01L 5/0061; G01L 5/08; G01L 5/10; G01L 5/101; G01L 5/108; G01L 5/167; G01L 5/171; G01L 5/28
USPC .................................................. 73/700–756
See application file for complete search history.

(56) References Cited

U.S. PATENT DOCUMENTS

| | | | | |
|---|---|---|---|---|
| 5,608,168 | A * | 3/1997 | Schoroth | G01L 21/12 73/204.19 |
| 8,504,313 | B2 * | 8/2013 | Cardinale | G01L 27/007 702/53 |
| 8,768,633 | B2 * | 7/2014 | Cardinale | G01L 21/10 702/53 |
| 11,808,643 | B2 * | 11/2023 | Brucker | G01L 21/14 |
| 11,946,823 | B2 * | 4/2024 | Brucker | G01L 9/0002 |
| 2009/0199649 | A1 * | 8/2009 | Kawasaki | G01L 21/12 73/755 |
| 2010/0132475 | A1 | 6/2010 | Kawasaki | |
| 2024/0019331 | A1 * | 1/2024 | Croft | G01L 21/12 |

(56) References Cited

U.S. PATENT DOCUMENTS

FOREIGN PATENT DOCUMENTS

| | | | |
|---|---|---|---|
| DE | 1648555 B1 | 5/1971 | |
| EP | 3690417 A1 * | 8/2020 | |
| WO | WO-9741414 A1 * | 11/1997 | ............. G01L 21/12 |

OTHER PUBLICATIONS

PCT Notification of Transmittal of the International Search Report and the Written Opinion of the International Searching Authority, or the Declaration and PCT Search Report dated Feb. 22, 2022 for corresponding PCT application Serial No. PCT/GB2021/052983, 5 pages.

PCT Written Opinion dated Feb. 22, 2022 for corresponding PCT application Serial No. PCT/GB2021/052983, 7 pages.

* cited by examiner

THERMAL CONDUCTIVITY VACUUM GAUGE AND THERMAL COMPENSATION ASSEMBLY

CROSS-REFERENCE OF RELATED APPLICATION

This application is a Section 371 National Stage Application of International Application No. PCT/GB2021/052983, filed Nov. 17, 2021, and published as WO 2022/106822A1 on May 27, 2022, the content of which is hereby incorporated by reference in its entirety and which claims priority of British Application No. 2018362.0, filed Nov. 23, 2020.

FIELD

This disclosure relates to a thermal conductivity vacuum gauge assembly. This disclosure also relates to a thermal conductivity vacuum gauge including the assembly.

BACKGROUND

Vacuum gauges are commonly used to measure the pressure in a vacuum system. The pressure measurement can be used to check that the system has a vacuum of sufficiently low pressure for its intended purpose. If the measurement indicates that the pressure of the vacuum in the system is insufficiently low this can be used to indicate and detect a leak or defect in the system and/or provide feedback to aid control of a vacuum pump evacuating the system.

A common type of vacuum gauge used for this purpose is a thermal conductivity vacuum gauge.

Thermal conductivity vacuum gauges utilize the thermal conductivity of gases for the purpose of pressure measurements, and may also be known as heat-loss vacuum gauges. In general, these gauges utilise the relationship between the thermal conductivity of a gas and its pressure in order to arrive at a pressure measurement.

One such thermal conductivity vacuum gauge is a Pirani gauge.

In a Pirani gauge, a heater element (usually in the form of a filament or wire) is placed in contact with the working gas in the vacuum system and is connected into an electrical circuit that allows it to be heated using electrical energy. As gas molecules collide with the heater element they will transfer (i.e., conduct) heat away from it. If the gas is of a higher pressure, then there will be more molecules colliding with the heater element and so more heat will be transferred away from the heater element (i.e., the gas has a higher thermal conductivity).

If the heater element is held at a constant current or voltage, then changes in the amount of heat transferred from the heater element due to changing gas pressure will cause its temperature (and thus resistance) to change a proportional amount. By measuring this change in resistance, the change in pressure of the gas can be measured. Alternatively, the heater element can be held at a constant temperature (and thus resistance), and the change in voltage needed to maintain this constant temperature depending on the gas pressure can be measured.

In this manner, the pressure of the gas is measured as a function of its thermal conductivity.

As will be appreciated by the skilled person, a common way to implement this in a Pirani gauge is to include the heater element as an arm in a Wheatstone bridge circuit.

In order to determine a more accurate pressure measurement in a thermal conductivity gauge, a thermal compensation element is generally necessary.

The thermal compensation element is an element or component that measures the ambient temperature of the gauge itself. This allows the pressure measurement to be compensated for this.

This can be achieved, for example, by using the thermal compensation element to provide a reference resistance or voltage according to the ambient temperature of the gauge for comparison to that of the heater element. This can help minimise measurement inaccuracies and inconsistencies associated with the ambient temperature of the gauge unintentionally affecting the resistance or voltage reading of the heater element.

As will be appreciated by the skilled person, one way to implement this thermal compensation in a Pirani gauge is to include the thermal compensation element (e.g., a temperature-dependent resistor) as an arm in the same Wheatstone bridge circuit as the heater element.

The thermal compensation element has been known to be placed on the surfaces of a body or tube of the gauge assembly.

The inventors have found that such known arrangements can provide potential inaccuracies and inconsistencies in the thermal compensation measurement, as well as possible durability issues for the element.

For example, it has been found that placing the element on an exterior surface of the gauge assembly means its measurement may be undesirably affected by the ambient temperature of the environment surrounding the gauge assembly, and it may be easily damaged. It has also been found that placing the element on an interior surface of the gauge assembly means it may be undesirably affected by the working/process gases passing through the gauge, and may be corroded thereby.

Accordingly, a need exists to provide a thermal conductivity vacuum gauge assembly that improves these aspects of the thermal compensation element used therein.

A general need also exists to provide improve modularity and replaceability for a thermal conductivity vacuum gauge including such an assembly.

Although this description generally exemplifies a Pirani gauge assembly, it is to be understood that any other suitable type of thermal conductivity vacuum gauge assembly (where a heater element is used and a temperature compensation element is required) may also benefit from this disclosure and are accordingly within the scope thereof. Such other thermal conductivity vacuum gauges may include, for example, a thermistor gauge assembly or a thermocouple gauge assembly.

The discussion above is merely provided for general background information and is not intended to be used as an aid in determining the scope of the claimed subject matter. The claimed subject matter is not limited to implementations that solve any or all disadvantages noted in the background.

SUMMARY

From one aspect, the present disclosure provides a thermal conductivity vacuum gauge assembly. The assembly comprises a body defining an internal chamber for receiving working gas, wherein the body is defined by a wall having an outer facing wall surface and an opposing inner facing wall surface. A heater element is disposed within the chamber; and a thermal compensation element is enclosed within the wall between the outer and inner facing wall surfaces.

Enclosing the thermal compensation element within the wall of the body provides a higher area of contact between the thermal compensation element and the body. This improves the durability and longevity of the thermal compensation element fixed within the body and makes its temperature reading more representative of the body and more accurate. This placement also means the thermal compensation element is protected within the wall itself (i.e., between the outer and inner wall surfaces), and is not as adversely affected by the external and internal environment around and within the body 110.

In general, this thermal compensation element placement makes the gas pressure measurement enabled by the assembly 100 more accurate, and increases the durability of the assembly 100.

In an embodiment of the above aspect, the thermal compensation element is a resistance temperature detector (RTD). In an alternative embodiment, the thermal compensation element is a thermistor. The thermistor may be a positive temperature co-efficient (PTC) thermistor or a negative temperature co-efficient (NTC) thermistor. In another alternative embodiment, the thermal compensation element is a solid-state temperature sensor.

These types of thermal compensation elements offer certain durability, cost and accuracy advantages over others.

In a further embodiment of either of the above, a cavity is enclosed within the wall between the outer and inner facing wall surfaces, and the thermal compensation element is disposed within the cavity.

The cavity provides a convenient manufacturing route (e.g., by machining) for disposing the thermal compensation element into the wall between the outer and inner facing wall surfaces.

In a further embodiment of any of the above, an electrical connection member is mounted to the thermal compensation element. A first portion of the electrical connection member is enclosed within the wall between the outer and inner facing wall surfaces and a second portion of the electrical connection member protrudes out from the wall. In further embodiments, the second portion includes an electrical connector for connection to a control circuit.

The electrical connection member provides a convenient means for mounting and supporting the thermal compensation element in the wall and providing electrical communication therewith from other components. The second portion and electrical connector also facilitate a more modular/removable electrical connection between the thermal compensation element and other components.

In a further embodiment of the above, the electrical connection member is a printed circuit board (PCB), and the thermal compensation element is surface mounted thereto.

The PCB in combination with surface mounting of the thermal compensation element provides a one-piece component that improves the durability of the connection to the thermal compensation element.

In a further embodiment of any of the above, the body extends along a longitudinal axis between a base and a top and has a sidewall extending between the base and the top. The thermal compensation element is enclosed within the sidewall.

In a further embodiment of any of the above, the cavity within which the thermal compensation element is disposed extends axially through the sidewall to an opening at the top.

In a further embodiment of any of the above, the first portion of the electrical connection member is disposed in the cavity and the second portion of the electrical connection member protrudes axially out from the top.

These configurations provide an orientation of the assembly components that facilitate replaceable electrical connection thereto (e.g., via the top), and provide for convenient installation thereof.

In further embodiments of any of the above, the base defines an inlet passage in fluid communication with the chamber, and includes a radially extending flange with may optionally include a recess therein for receiving a seal (such as an O-ring seal or metal seal).

This flange allows for a more secure fit of the assembly to a vacuum system and the recess provides for a better seal to be formed between the assembly and the vacuum system when in use.

In a further embodiment of any of the above, the base includes a filter element disposed across the inlet passage for filtering the working gas.

The filter element can help ensure that contaminants that may damage the assembly or interfere with pressure measurement do not enter the chamber.

In a further embodiment of any of the above, the heater element is a filament for heating by an electrical power source. In examples, the filament may be made of Platinum or Tungsten. Such an assembly may be known generally as a Pirani gauge assembly.

In another aspect, the present disclosure provides a thermal conductivity vacuum gauge. The gauge comprises the assembly of any of the embodiments of the above aspect and a housing that receives and at least partially surrounds the body.

The housing and the connections thereto facilitated by the embodiments of the assembly allow for improved modularity and replaceability for the thermal conductivity vacuum gauge.

In an embodiment of the above, the housing includes a control circuit for providing electrical control of the heater element and the thermal compensation element.

The control circuit can allow the housing to act as a replaceable, modular add-on to the assembly that allows interrogation of the assembly pressure measurement.

Although certain advantages have been discussed in relation to certain features above, other advantages of certain features may become apparent to the skilled person following the present disclosure.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF DRAWINGS

One or more non-limiting examples will now be described, by way of example only, and with reference to the accompanying figures in which.

DETAILED DESCRIPTION

Figure 1:
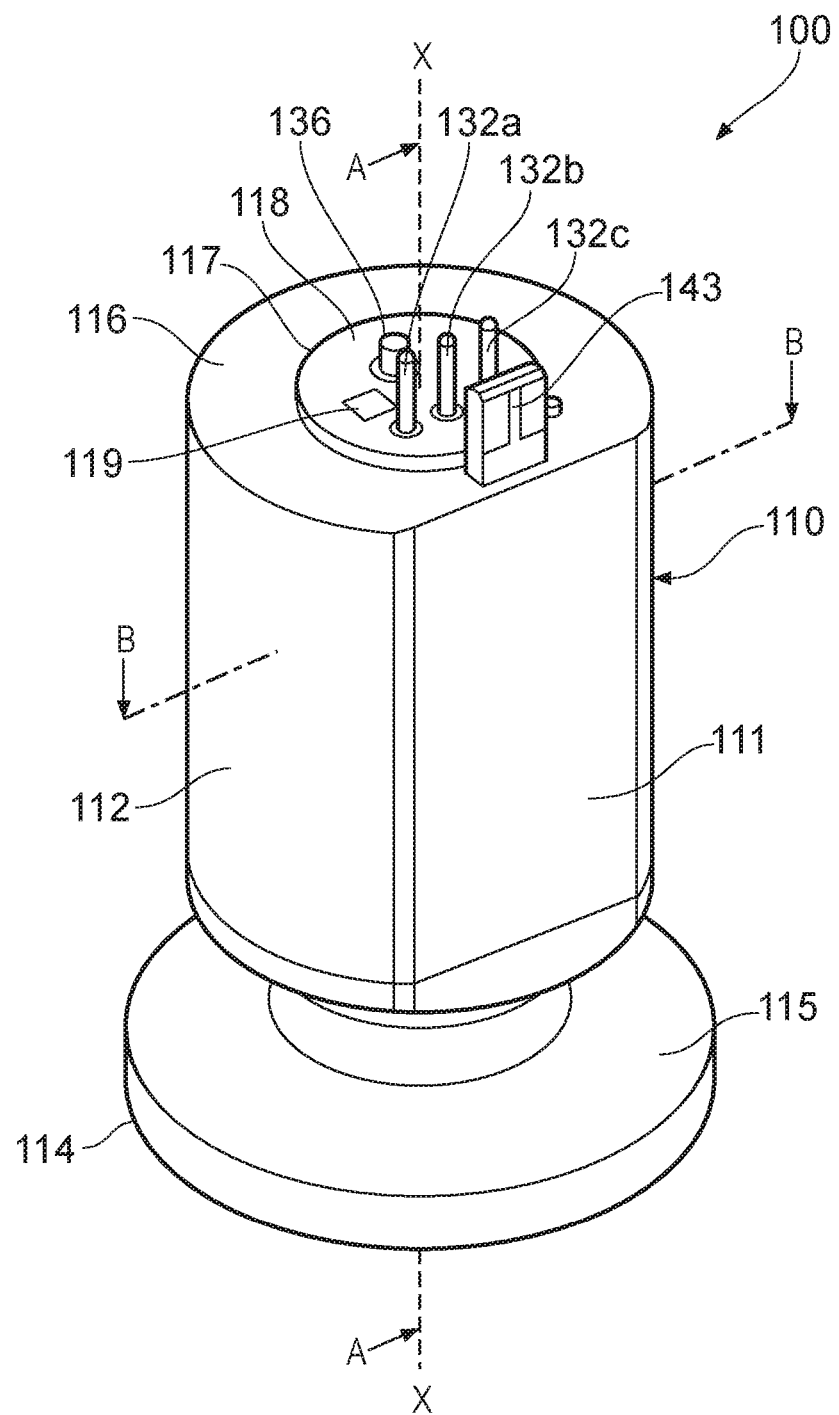
FIG. 1 shows an exterior isometric view of a thermal conductivity vacuum gauge assembly in accordance with an embodiment of the present disclosure.

Referring to FIG. 1, a thermal conductivity vacuum gauge assembly 100 is shown. The assembly 100 includes a body 110 that has a sidewall 112 that extends axially along a longitudinal axis X between a base 114 and a top 116.

In the depicted embodiment the body 110 is generally annular, but with a chamfered section 111 around a portion of the circumference. As discussed below, this chamfered section 111 can aid attachment of the assembly with other component parts of a thermal conductivity vacuum gauge (e.g., a housing or covering (not shown)).

Although a specific shape of body 110 is depicted, it should be understood that within the scope of this disclosure any other suitable shape of body 110 can be used (e.g., square or rectangular cross-section).

The base 114 includes a flange 115 extending radially therefrom around longitudinal axis X). In one example, the flange 115 has a 16 mm nominal bore specification The top 116 includes an end cap 118 through which electrical connector 132 and support features 136 for a heater element 130 protrude (discussed below with reference to FIGS. 2A and 2B), and are secured therein.

The end cap 118 is fixed within an opening 117 defined in the top 116.

In some embodiments, the end cap 118 may be fixedly attached to the top 116, for example, by being welded into the opening 117, or by being press-fit therein. In other embodiments, the end cap 118 may be removably fixed into the top 116 by threaded engagement therewith. Such removable fixation methods may facilitate repair and replacement of the heater element 130 and connection and support features. In yet further embodiments, the end cap 118 may be omitted and the wall 122 of the body 110 extends radially across the top 116 without the opening 117 therein. In such embodiments, the connection and support features would extend through the wall 122 at the top 116 itself.

In the depicted embodiment, the end cap 118 includes a marking area 119, which provides an area for the marking of various numbers or codes related to assembly manufacture (e.g., part number/bar code, batch number etc.). It should be understood that within the scope of this disclosure such a marking area 119 could alternatively be present on any other suitable part of the assembly 100 or omitted all together.

Figure 2A:
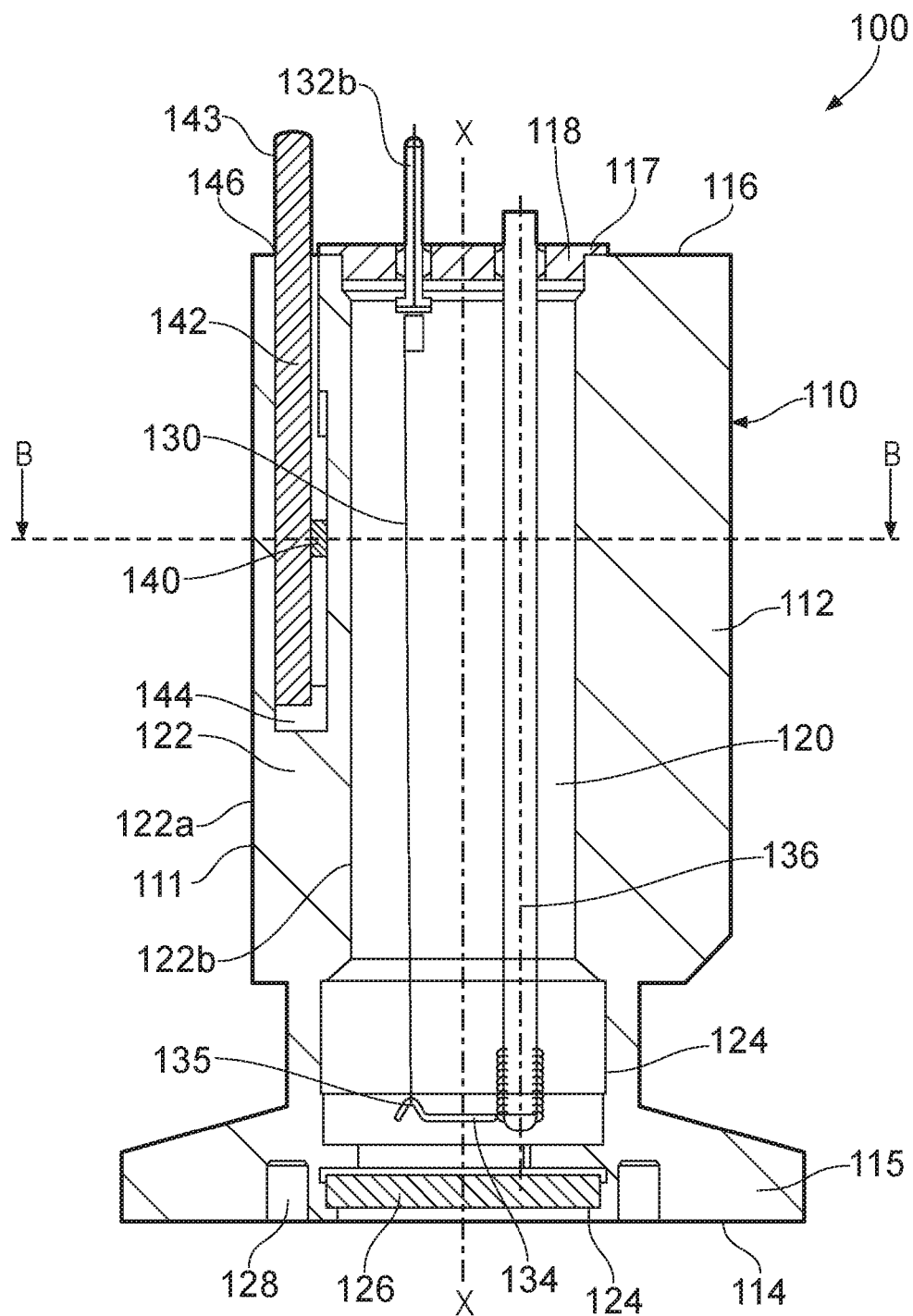
FIG. 2A shows a cross-section of the assembly of FIG. 1 viewed along line A-A.
Figure 2B:
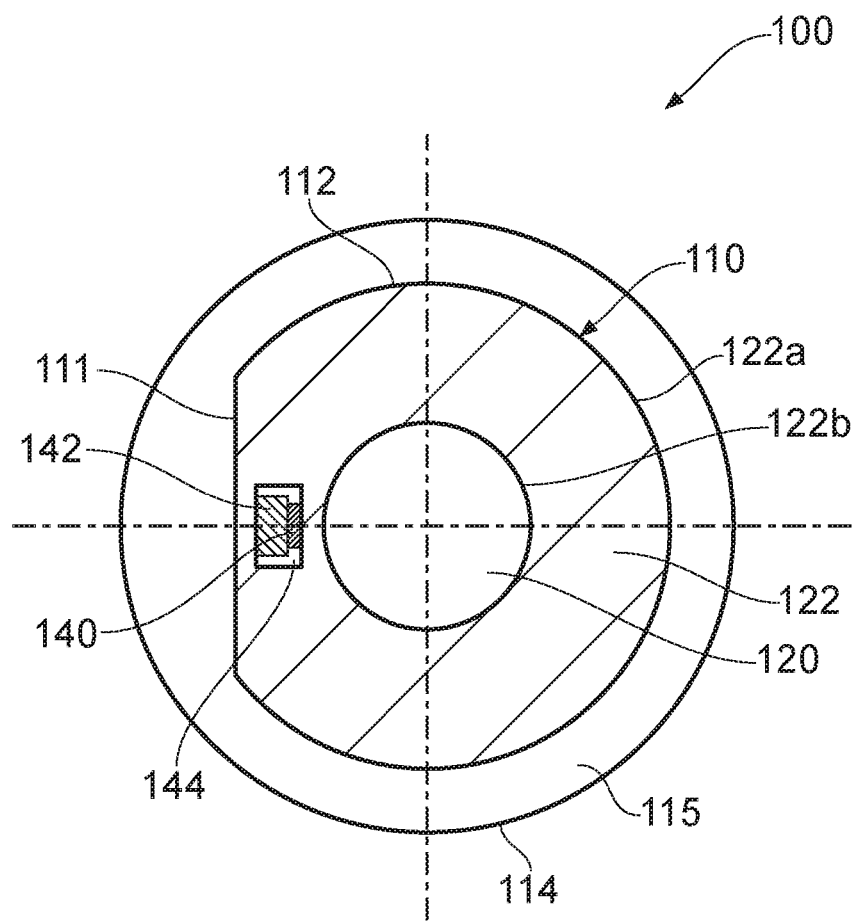
FIG. 2B shows a cross-section of the assembly of FIG. 1 viewed along line B-B.

FIG. 2A shows a cross-section of assembly 100 taken along the longitudinal axis X (along the line defined by arrows A-A) and viewed in the direction of arrows A-A. FIG. 2B shows a cross-section 100 taken transverse to the longitudinal axis X (along the line defined by arrows B-B) and viewed in the direction of arrows B-B.

FIGS. 2A and 2B give a view of the internal structure and components within the body 110, as discussed below.

The body 110 defines an internal chamber 120 which is configured to receive working or process gas (e.g., from a vacuum system) when the assembly 100 is in use. By 'working or process gas', it is meant the gas (or gases) that the assembly intends to measure the pressure of. The 'working gas' is usually the gas (or gases) that are being worked on (e.g., being evacuated) by the vacuum system. The pressure of this gas can provide an indication of the general pressure of vacuum in the system.

In the depicted example, the body 110 is generally tubular, and may also be known as a 'body tube'. The internal chamber 120 is accordingly generally cylindrical about the longitudinal axis X within the body 110.

The body 110 is defined or formed by a wall 122. The wall 122 is defined between an outer facing wall surface 122a and an opposing, inner facing wall surface 122b. Surfaces 122a and 122b are generally annular in accordance with the depicted shape of the body 110. The outer facing wall surface 122a is radially outward of the inner facing wall surface 122b and faces the exterior of the assembly 100. The inner facing wall surface 122b faces the interior of the assembly 100 and defines (or encloses) the internal chamber 120.

The body 110 could be made of any suitable material, such as a stainless steel or aluminium alloy, or plastic material (where operating conditions and temperature permit). The body 110 can also be made from any suitable manufacturing method, such as by being moulded/cast, machined from a solid block or 3D printed.

The base 114 defines an inlet passage 124 for the chamber 120.

The inlet passage 124 extends axially from the base 114 and into the chamber 120. The inlet passage 124 is in fluid communication with the chamber 120, and permits working gas (e.g., from a vacuum system) to enter and exit the chamber 120 during use.

A filter element 126 is disposed across the inlet passage 124 for filtering the working gas before it enters the chamber 120. The filter element 126 passes radially across the inlet passage 124 relative to the longitudinal axis X. The filter element 126 is used to ensure contaminants do not enter the chamber 120. Such contaminants may damage the assembly 100 (e.g., by corroding or depositing on the heater element 130, wall surface 122b or electrical connections within the chamber 120) and/or may interfere with the pressure measurement process and provide inaccuracies therein. In one example, the filter element 126 is a stainless steel mesh, although any other suitable type (e.g., a membrane) or material for filter element 126 may be used within the scope of this disclosure.

The flange 115 of the base 114 includes a recess or groove 128 defined therein. The recess 128 is annular around the longitudinal axis X and permits a seal to be seated therein. This can allow a better seal to be formed between the assembly 100 and a vacuum system when in use, and secured in position at the base 114 via flange 115. The seal can be any suitable type of seal, such as an O-ring seal or a metallic seal. In other embodiments, a (e.g., metallic) gasket arrangement between the flange 115 and the system may be used instead.

A heater element 130 is disposed within the chamber 120. In the depicted example, the heater element 130 extends generally axially into the chamber 120 from the top 116 towards the base 114.

The heater element 130 in the depicted embodiment is a filament for heating by an electric power source. The filament may be made from any suitable material, such as Tungsten or Platinum. Platinum in particular, may be used in vacuum system environments or applications that are known to contain more corrosively aggressive agents and/or working gases.

Electrical connectors or pins 132a, 132b, 132c protrude through the end cap 118 and are secured therein. The heater element 130 is connected to certain ones of the electrical connectors 132a, 132b, 132c to permit electrical communication therewith for control of the heater element 130. In the depicted example, the connectors 132a, 132c are connected to two opposing ends of the heater assembly 130, whilst the connector 132b is used for grounding purposes. The connectors 132a, 132b, 132c can be subsequently connected to a separate control circuit (not shown) that can provide electrical power to heat and control the heater assembly 130 when the assembly 100 is in use.

The heater element 130 can be connected in any suitable manner to connectors 132*a*, 132*c*, e.g., by being wrapped around a base of the connectors or welded or soldered thereto etc.

The heater element 130 is supported within the chamber 120 by a support structure. In the depicted example, the support structure is in the form of a spring arm 134 and a bar 136.

The bar 136 protrudes through end cap 118 and is secured thereto. The bar 136 extends axially into the chamber 120 from the top 116 towards the base 114 substantially parallel to the heater element 130. In the depicted embodiment, the bar 136 is a cylindrical rod.

The spring arm 134 is secured to the end of the bar 136 nearest the base 114, and extends radially (relative to the longitudinal axis X) to support the heater element 130.

The spring arm 134 features a hook 135 around which the heater element 130 is passed. The spring arm 134 and bar 136 are used to provide a tension that keep the heater element 130 taught and supported in use between the connectors 132*a*, 132*c*.

As will be appreciated, in the depicted embodiment, the heater assembly 130 provides a substantially V-shape or U-shape when hung between the connectors 132*a*, 132*c* via the hook 135.

Although one particular arrangement of the heater element 130, electrical connectors 132*a*, 132*b*, 132*c* and support structure thereof is shown, it is to be understood that within the scope of this disclosure any other suitable arrangement may be used. For example, different numbers and types of electrical connectors 132*a*, 132*b*, 132*c*, a different type of heater element 130 (e.g., a thermistor), and different numbers or types of components to bar 136 and spring arm 134 may be used.

A thermal compensation element 140 is enclosed within the wall 122 of the body 110. More particularly, the thermal compensation element 140 is enclosed within the wall 122 between the outer and inner facing wall surfaces 122*a*, 122*b*. In this manner, the thermal compensation element 140 is enclosed within the thickness of the wall 122 itself, and is spaced apart from the outer and inner facing wall surfaces 122*a*, 122*b* by portions of the wall thickness.

It is to be understood that such placement is distinct from a thermal compensation element 140 being placed merely in a recess or well provided in the wall 122 (i.e., a recess or well provided in one of the outer or inner facing wall surfaces 122*a*, 122*b*), as this still places the thermal compensation 140 on one of the outer or inner wall surfaces 122*a*, 122*b*.

The thermal compensation element 140 may be of any suitable type e.g., that can provide a resistance and/or voltage indicative of an ambient temperature of the wall 122 within which it is disposed. In one example, the thermal compensation element 140 is a resistance temperature detector (RTD), such a Molybdenum or Platinum RTD. In another example, the thermal compensation element 140 is a thermistor, such as a positive temperature co-efficient thermistor (PTC) or a negative temperature co-efficient thermistor (NTC) made of powdered metal oxides or a polymer. In another example, the thermal compensation element 140 could be a solid-state temperature sensor.

Although other types of thermal compensation element 140 fall within the scope of the present disclosure, it is thought that the above offer certain durability, cost and accuracy advantages over others.

It is to be appreciated that the enclosure of the thermal compensation element 140 within the wall 122 of the body 110 as depicted is thought to provide certain advantages over prior art arrangements.

For example, it provides a more robust and durable fixation for the thermal compensation element 140 in the assembly 100, which can improve its service life. It can also improve the amount of physical contact between the thermal compensation element 140 and the body 110, which means its temperature measurement may be more representative thereof and provide more accurate compensation. The enclosing of the thermal compensation element 140 within the wall 122 also means it is less likely to be affected by the external or internal environment around the assembly 100, which also helps make its temperature measurement of the body 110 more representative and accurate.

In this way, the enclosure of the thermal compensation element 140 within the wall 122 can make the overall pressure measurement of the working gas in the chamber 120 enabled by the assembly 100 more accurate. It can also make the assembly 100 generally more durable.

An electrical connection member 142 is mounted to the thermal compensation element 140. The electrical connection member 142 allows electrical communication between the thermal compensation element 140 and a control circuit (not shown) that can be connected thereto.

In the depicted embodiment, the electrical connection member 142 is a printed circuit board (PCB) of the FR-4 specification; however, any suitable type of electrical connection member 142 (e.g., wires) could be used instead, or a PCB of any other suitable specification. By using a PCB in the depicted embodiment, the electrical connection member 142 also provides a durable/rigid substrate that offers some mechanical support for the thermal compensation element 140.

A first portion of the electrical connection member 142 is enclosed within the wall 122 (i.e., between surfaces 122*a*, 122*b*) and extends axially therein. A second portion protrudes axially out from the wall 122 from the top 116.

The second portion includes an electrical connector 143 that is suitable to provide an electrical connection between the member 142 and a control circuit (not shown), and allow electrical communication between such a control circuit and the thermal compensation element 140 to inform the pressure measurements made by the assembly 100.

In the depicted embodiment, the thermal compensation element 140 is surface mounted to the electrical connection member 142.

This permits the thermal compensation element 140 to be made integrally with the electrical connection member 142 as a one-piece component that has cost, installation and durability benefits.

Nonetheless, within the scope of this disclosure, any other suitable method of mounting thermal compensation element 140 to the member 142 may be used, such as through-hole or soldering techniques.

In the depicted embodiment, a cavity 144 is defined within the wall 122. The cavity 144 has an opening 146 through the wall 122 at the top 116 and extends axially towards the base 114 through the wall 122. The cavity 144 is enclosed within the wall 122 between the wall surfaces 122*a*, 122*b*.

The electrical connection member 142 and thermal compensation element 140 are disposed within the cavity 144, and are inserted axially therein. The member 142 may be secured in the cavity 144 using any suitable means, such as an adhesive, or may be held loosely in the cavity 144 without a securing means in place (e.g., under its own weight).

Placing the thermal compensation element 140 and member 142 in the cavity 144 may provide improved accessibility for inspection, repair and/or replacement of the thermal compensation element 140/member 142.

In other embodiments (not shown), the cavity 144 may be omitted. Instead, the thermal compensation element 140 and member 142 are enclosed integrally within the wall 122 without a cavity 144 defined there around (e.g., by insert moulding/casting/additively manufacturing therewith). This may improve the longevity/durability of the thermal compensation element 140 and member 142 within the wall 122, as well as improve the amount of contact between the thermal compensation element 140 and the wall 122 (for improved temperature compensation), at the expensive of easy replaceability.

Although the depicted embodiments show the thermal compensation element 140, electrical connection member 142 and cavity 144 disposed generally in the sidewall 112 of the body 110, it is to be understood that they may be disposed in any other suitable part or portion of the body 110 defined by a wall 122 thereof (e.g., the base 114 or the top 116), as may suit a particular application or vacuum system.

In one example, a thermal conductivity vacuum gauge (not shown) is formed using the assembly 100 by the assembly 100 being received in a housing or cover (not shown) that at least partially surrounds the body 110. The housing can generally include the control circuit and/or electronics (e.g., remainder of a Wheatstone bridge circuit) that can be connected to the assembly 100 in order to control and operate the heater element 130 in combination with the thermal compensation element 140.

The electrical connectors 132a, 132b, 132c, 143 protruding from the assembly 100 can facilitate ease of integration with the housing, as they can simply be connected and disconnected to ports therein when the housing receives the assembly 100. This can also aid modularity and replaceability for the housing and assembly 100.

The housing can feature its own electrical connections/connectors that will allow the control circuit/electronics and the assembly 100 to be powered and interrogated, as necessary.

The housing can also feature a screen/readout thereon. This screen/readout can display/indicate the measured pressure value or other parameters associated with the gauge/assembly 100 (e.g., resistance, temperature, voltage etc.) and the vacuum system it is measuring.

As discussed briefly above, the shape of body 110, including chamfered section 111, can be used to aid attachment of the housing. For example, the chamfered section 111 provides a flat axial surface to aid insertion and fitment of the housing on the body 110. It may also provide an easy visual reference to ensure the housing is inserted over the body 110 in the correct orientation.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A thermal conductivity vacuum gauge assembly comprising:
   a body defining an internal chamber for receiving working gas, wherein the body is defined by a wall having an outer facing wall surface and an opposing inner facing wall surface;
   a heater element disposed within the chamber;
   a thermal compensation element enclosed within the wall between the outer and inner facing wall surfaces; and
   a printed circuit board that the thermal compensation element is mounted to, wherein a first portion of the printed circuit board is enclosed within the wall between the outer and inner facing wall surfaces and a second portion of the printed circuit board protrudes out from the wall.

2. The assembly of claim 1, wherein the thermal compensation element is a resistance temperature detector (RTD).

3. The assembly of claim 1, wherein the thermal compensation element is a thermistor, for example, a positive temperature co-efficient (PTC) thermistor or a negative temperature co-efficient (NTC) thermistor.

4. The assembly of claim 1, wherein a cavity is enclosed within the wall between the outer and inner facing wall surfaces, and the thermal compensation element is disposed within the cavity.

5. The assembly of claim 1, wherein the second portion includes an electrical connector for connection to a control circuit.

6. The assembly of claim 1, wherein:
   the body extends along a longitudinal axis between a base and a top and has a sidewall extending between the base and the top; and
   the thermal compensation element is enclosed within the sidewall.

7. The assembly of claim 6, wherein a cavity within which the thermal compensation element is disposed extends axially through the sidewall to an opening at the top.

8. The assembly of claim 6, wherein the first portion of the printed circuit board is enclosed in the cavity and the second portion of the printed circuit board protrudes axially out from the top.

9. The assembly of claim 6, wherein the base defines an inlet passage in fluid communication with the chamber, and includes a radially extending flange with a recess therein for receiving a seal.

10. The assembly of claim 9, wherein the base includes a filter element disposed across the inlet passage for filtering the working gas.

11. The assembly of claim 1, wherein the heater element is a filament for heating by an electrical power source.

12. A thermal conductivity vacuum gauge comprising:
   the assembly of claim 1; and
   a housing receiving and at least partially surrounding the body.

13. The vacuum gauge of claim 12, wherein the housing includes a control circuit for providing electrical control of the heater element and the thermal compensation element.

* * * * *